Oct. 3, 1933.　　　A. S. FITZ GERALD　　　1,929,060
ALTERNATING CURRENT POWER TRANSLATING OR CONTROL CIRCUITS

Filed Dec. 17, 1931　　5 Sheets-Sheet 1

Fig 1

INVENTOR.
Alan S. Fitz Gerald

Oct. 3, 1933.  A. S. FITZ GERALD  1,929,060
ALTERNATING CURRENT POWER TRANSLATING OR CONTROL CIRCUITS
Filed Dec. 17, 1931  5 Sheets-Sheet 2

(a) Input at frequency "F"

(g) Output of (30)

(b) Input to (3)

(h) Current in (12) and (13)

(c) Input to (30)

(i) Current in (120) and (130)

(d) Current in (5) and (6)

(j) Output of (4)

(e) Current in (50) and (60)

(k) Output of (40)

(f) Output of (3)

(l) Output to load (2)

Fig 2  INVENTOR.
Alan S. FitzGerald

Patented Oct. 3, 1933

1,929,060

UNITED STATES PATENT OFFICE 1,929,060

ALTERNATING CURRENT POWER TRANSLATING OR CONTROL CIRCUITS

Alan S. Fitz Gerald, Wynnewood, Pa.

Application December 17, 1931
Serial No. 581,614

30 Claims. (Cl. 171—97)

In systems of the general type to which my invention pertains, during each half cycle when the anode becomes positively energized, and during which, in consequence, current may, if not otherwise prevented, flow in the anode circuit of the vapor electric conducting device, the voltage of the grid, according to the phase relation between the grid voltage and the anode voltage, may either become positive at the same instant that the anode becomes positive or it may be arranged to become positive at a later instant in the positive half cycle of the anode voltage. The grid and anode voltages will become positive at the same instant if there is no phase difference therebetween and, under this condition, the vapor electric device will conduct current through the positive half cycle in the same manner as a two electrode rectifier. But if the grid voltage be so given a phase displacement that it lags behind the anode voltage then, under this condition, the grid will become positive, not at the commencement of the cycle, when the anode first becomes positively energized, but at a later period in the cycle.

Not until the grid becomes positive will vapor electric devices of this type permit current to flow between anode and cathode. Accordingly, the greater the phase difference between anode and grid voltages the later in the positive half cycle will the vapor electric device become conducting and the smaller will be the average value of the current passed during the half cycle. Thus, if the grid voltage be in phase with the anode voltage, current will flow during the whole positive half cycle and the vapor electric device will be conducting to exactly the same extent as a two electrode rectifier. If the grid voltage be given a lag of 90° relative to the anode voltage, current will only flow during the latter half of the positive half cycle and the average value will be one-half of the current that would be conducted under similar conditions by a rectifier. If the grid voltage be given a 180° lag no current at all will flow in the device.

Various applications have been made of the foregoing control principle utilizing, in most cases pairs of vapor electric devices energized from an alternating current source and so arranged that one device passes current during one half cycle of the supply voltage and that the second device passes current during the other half cycle. The output circuits of the vapor electric devices may be connected in like sense, which will give rectified output, or in opposite sense giving alternating current output. In the first case there will be furnished, in accordance with the phase of the grid voltage, a direct current which may be varied from a value corresponding to full half wave rectification down to zero. In the second case there will be furnished an alternating current similarly capable of amplitude control.

My invention relates more particularly to the latter method in which an alternating current input to a system of vapor electric conducting devices is arranged to furnish an alternating current output variable from a maximum to zero according to the grid voltage phase control. In the past vapor electric devices have been applied more extensively in connection with requirements involving rectified output and have, by reason of certain inherent difficulties, been used to a less extent for providing a controlled alternating current output.

It is an object of my invention to avoid these difficulties; other objects will, hereinafter, become apparent.

The exact nature of the obstacles that have been encountered in employing vapor electric devices with phase shift control will be better appreciated if the manner in which the grid control action operates, be considered. If the grid voltage be in exact phase coincidence with the anode voltage normal conductivity throughout the positive half cycle occurs. But if the grid voltage be given a lagging phase displacement of, for example 90°, no current will flow during the first half of the positive half cycle. The anode current will then commence to flow and will have an initial value corresponding to the full rectified current at that instant. The full rectified value will flow through the remainder of the positive half cycle. Similar action will be furnished if the current be permitted to commence to flow either earlier or later in the half cycle. In each case there will be a period of zero current, an abrupt change to an initial value corresponding to the period in the cycle when this occurs, followed by a period of operation in accordance with normal rectifying action the instantaneous value of the current being the same as would be furnished by a vapor electric rectifier under similar conditions.

Thus the wave shape of the output half cycle will be sinusoidal only if the grid voltage be in phase coincidence with the anode voltage. To an extent depending upon the degree of controlling action exerted by the grid voltage phase shift, that is, the more the anode current is reduced in its average amplitude by grid action, the wave form of the output will depart from true sinusoidal form. The resulting wave form distortion is by no means negligible and constitutes a major obstacle to the application of this system of control, especially under conditions when an alternating current output is required. The "chopped" or distorted half wave resulting from grid control according to this method includes a convergent series of harmonic frequencies ranging from simple multiples of the power frequency up.

The lower frequency harmonics are present in considerable amplitude. The total harmonic content of the "chopped" wave varies from zero to as much as fifty per cent of the power represented by a complete rectified half-wave such as is obtained when the grid voltage is in phase with the anode voltage and the vapor electric device operates as a simple rectifier.

It follows, therefore, that the component of harmonic content considered as a fraction of the "chopped" half wave itself may greatly exceed the power frequency component. This condition, for instance, obtains when the grid voltage lags nearly 180° behind the anode voltage. Under this condition no current is carried for very nearly the complete positive half cycle, and current begins to flow almost at the end of the half cycle. The wave shape generated by this condition will be of a spear-point form consisting of the area bounded by the final downward-tending portion of the sine wave and an intersecting perpendicular slightly displaced from the point at which the sine wave cuts the zero line. Under such a condition the harmonic content of the current actually passing may be fifty per cent or more in excess of the power frequency component.

These circumstances have not precluded the use of vapor electric control systems according to this method for applications involving a direct current output. Several reasons have contributed to this. Where rectification is an object a certain amount of filtering equipment is usually necessary in order to smooth out the irregularities which result from rectification of sinusoidal half waves and the additional filtering equipment necessary to eliminate the increased harmonic content resulting from grid voltage phase shift control may not, in proportion to what is necessary in the case of sine wave power, represent a serious economic restriction. Furthermore, special forms of filter condensers, applicable only to direct current rectified power, are available and which cost substantially less than condensers of the types which may be used with alternating current. In addition, polyphase sources of alternating current power are frequently associated with rectification systems and, in such cases, the filtering equipment is simpler and less expensive than the apparatus necessary for a single phase circuit.

Vapor electric power control systems, of the grid voltage phase shift type, involving alternating current output, however, are very seriously restricted in their application by the deformation of wave shape which results from the manner in which each half wave of anode current is modified by the action of the grid control. The wave shape which results can only be used for a very few applications where the wave form is of no particular importance such as certain heating and illuminating control systems. For all other practical power applications filtering circuits must be provided which will convert the deformed wave shape into substantially a sine wave. Such filters must operate selectively, rejecting all of the harmonic content and, at the same time, permitting conductance of the power frequency component of the deformed wave of current.

The values of capacitance and reactance required for the various condensers and reactors of a filter circuit are usually of the same order of magnitude as might be associated with resonant circuits of the frequency of the power circuit. The cost of the necessary condensers and reactors, and the losses therein, for a 60 cycle power circuit presents a serious obstacle to the use of grid phase shift methods in alternating current power control systems.

The filter problem has, hitherto, prevented the practical use of alternating current vapor electric control systems operating on the grid voltage phase shift principle at 60 cycle frequency. The difficulties which would attend the use of such methods at frequencies of 50, 40, 25 or 16⅔rds cycles are manifestly of correspondingly increased seriousness and have, heretofore, appeared to be insuperable.

It is, therefore, a further object of my invention to provide an improved vapor electric power control system, operating upon a novel principle, for providing an alternating current output derived from an alternating current power source, capable of being controlled in amplitude from zero to a maximum, by means of the grid voltage phase shift principle, and in which the wave shape of the output power shall be substantially coincident with that of the alternating current power source energizing the system.

It is a further object of my invention to provide a vapor electric power control system having an alternating current output of good wave shape in which no power frequency filter equipment is embodied and including no reactors or condensers rated to carry the controlled power or an appreciable proportion thereof at the power frequency.

It is a still further object of my invention to provide an alternating current power frequency vapor electric power control system which shall be simple and efficient, and shall be distinguished from the prior art by the fact that it is inexpensive.

The foregoing objects, and other objects appurtenant thereto, I prefer to accomplish by converting energy drawn from a power network, at any commercial frequency, into energy at a higher frequency, transforming or controlling the energy at the latter frequency and thereafter deriving from said transformed or controlled energy, direct current energy or energy at a predetermined frequency for application to a load.

The novel features which I believe to be characteristic of my invention will be set forth, with particularity, in the appended claims. My invention itself, however, both as to its organization and method of operation together with further objects and advantages thereof, may best be understood by reference to the following description taken in connection with the accompanying drawings, in which

Figure 1:
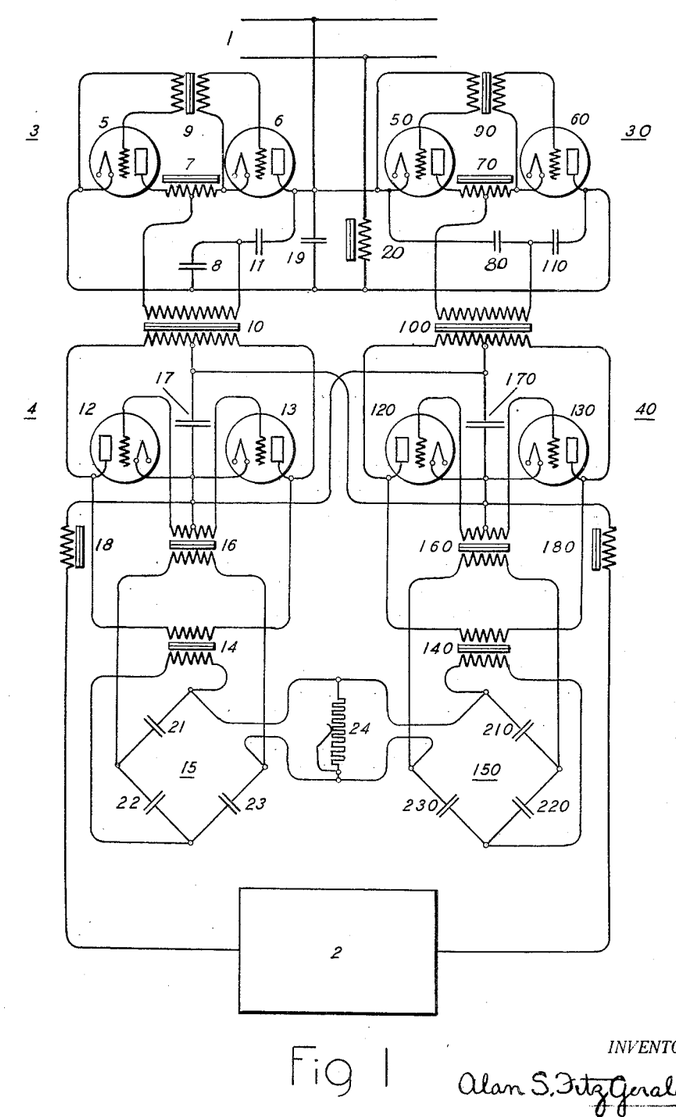
Fig. 1 is a diagrammatic view of a power control system including a preferred embodiment of my invention.

Referring to Fig. 1, a source of alternating current power 1 is arranged to supply current to a motor or other load device 2, which may be a power consuming or a power translating device such as a transformer, through a power control circuit organized according to my invention which circuit includes two electric power inverters or frequency changers 3 and 30 and two grid controlled rectifiers 4 and 40 arranged to operate in accordance with my invention.

Instead of attempting to control the power by means of the grid voltage phase shift method which, as hereinbefore explained, involves wave form distortion which it is impossible, without prohibitive expense, to filter, at the power frequency, I first convert the alternating current input, by means of the inverters 3 and 30 into electrical energy of a substantially higher frequency, having an amplitude the envelope of which corresponds to the power frequency input. With this high frequency power I then energize controlled rectifiers consisting of vapor electric devices having control electrodes or grids provided with grid voltage phase shift means of controlling the amplitude of the anode current.

It is specially to be noted that the novel feature of my invention resides in the fact that this grid voltage phase shift control is carried out, not at the power frequency but at the higher frequency. The wave form distortion which results from the grid voltage phase shift control action is a distortion of this higher frequency alternating current wave. It is well known that the cost of filtering means varies inversely as the frequency of the electrical energy filtered. Thus the distortion occurring in the high frequency circuit due to the grid control action may readily be eliminated by filtering means of negligible bulk and cost in comparison with the equipment which would be necessary to filter an equivalent deformation of wave shape at the power frequency.

The output of the controlled rectifiers therefore is controllable in amplitude by grid voltage phase shift means. The envelope of the rectifier output, however, is in accordance with the power frequency source wave shape. After filtering out the high frequency component the output of the rectifiers will be alternating current power of regular wave shape and controlled in amplitude by the phase shift device. The manner in which this principle is carried into effect will be readily understood by reference to Fig. 1 and Fig. 2.

As shown in Fig. 1, I provide the two electric power inverters 3, 30 energized by the source 1. These may be of any suitable type and may include vapor electric devices or such other means as may be adaptable to the required purpose. By way of example I show in Fig. 1 a vapor electric inverter circuit of the type disclosed in my Patent No. 1,752,247 but I wish it to be clearly understood that any other suitable frequency changing device may be used in this manner in accordance with the spirit of my invention.

Inverters 3, 30 include a plurality of vapor electric devices 5, 6 and 50, 60, each having anode, cathode and control electrodes, mid-tapped reactors 7, 70, condensers 8, 80, grid transformers 9, 90 and primary windings of output transformers 10, 100. The transformation ratio may be given any desired value, according to the voltage of supply and the requirements of the load. The operation of the inverters 3, 30 is substantially as explained in Patent No. 1,752,247.

In addition I provide condensers 11, 110 connected between the anodes of 6, 60 and the junction between 8, 80 and 10, 100. The operation of the inverters is substantially the same when these condensers 11, 110 are present, with the additional advantage that the current drawn from the source from which an inverter of this type is operated is less discontinuous due to the presence of the condensers.

An inverter, as such, is a device for converting direct current into alternating current. An inverter of the type shown in Fig. 1 will generate alternating current continuously when connected to a direct current source the anode of the device 6 being connected to the positive terminal of the said source. The amplitude of the alternating current output of the inverter, other circuit constants remaining unchanged, will be in direct proportion to the magnitude of the said direct current source. If on the other hand the inverter be connected to the direct current source with the anode of 6 connected to the negative terminal the inverter, due to the unilateral conducting characteristic of the vapor electric device 6, will be entirely inoperative, neither generating alternating current output nor drawing direct current from the source.

It will be apparent to those skilled in the art that the vapor electric devices 6, and 50 should have such characteristics, obtained either by design of the devices or by the use of appropriate grid bias voltage, that the inverters start into oscillation spontaneously and promptly when positive anode voltage is applied.

If, now, such an inverter, arranged to operate at a frequency "$f$", be connected to an alternating current source of a frequency "F" substantially less than the operating frequency of the inverter, it will operate intermittently. During the half cycles when the anode is negative the inverter will be inoperative. But during the positive half cycles the inverter will draw current from the alternating current source and will deliver an alternating current output of the inverter frequency. It has been pointed out above that in the case of an inverter operating from a direct current source the amplitude of the alternating current output will be proportional to the voltage of the direct current source. Thus, in the case of an inverter operating from an alternating current source, during the half cycles when the anode of 6 is positive, the amplitude of the alternating current output will at any instant be proportional to the instantaneous value of the voltage of the alternating current source. The output will be zero during the negative half cycle. Accordingly, the output of the inverter 3 will consist of intermittent alternating current of frequency "$f$", which has, of course, both positive and negative half waves and which is interrupted during the negative half cycles of frequency "F". During the positive half cycles of frequency "F" the amplitude of the alternating current output of frequency "$f$" will be proportional to the instantaneous value of the source of frequency "F". In other words the intermittent alternating current output of frequency "$f$" will have an envelope corresponding to the wave shape of the source of frequency "F".

Referring now to Fig. 1, let it be supposed that the frequency "F" of the source 1 be for example 25 cycles. I may design the inverters 3, 30 to generate alternating current output of a frequency "$f$" of twenty times, or more, the frequency "F". Let it be supposed that "$f$" be 500 cycles. The inverters 3, 30 I connect to the power source 1 in opposite sense. Thus the inverter 3 will operate on one half cycle and the inverter 30 will be inoperative during the time 3 is generating output of frequency "f" and will operate during the half cycle when 3 is inert.

Figure 2:
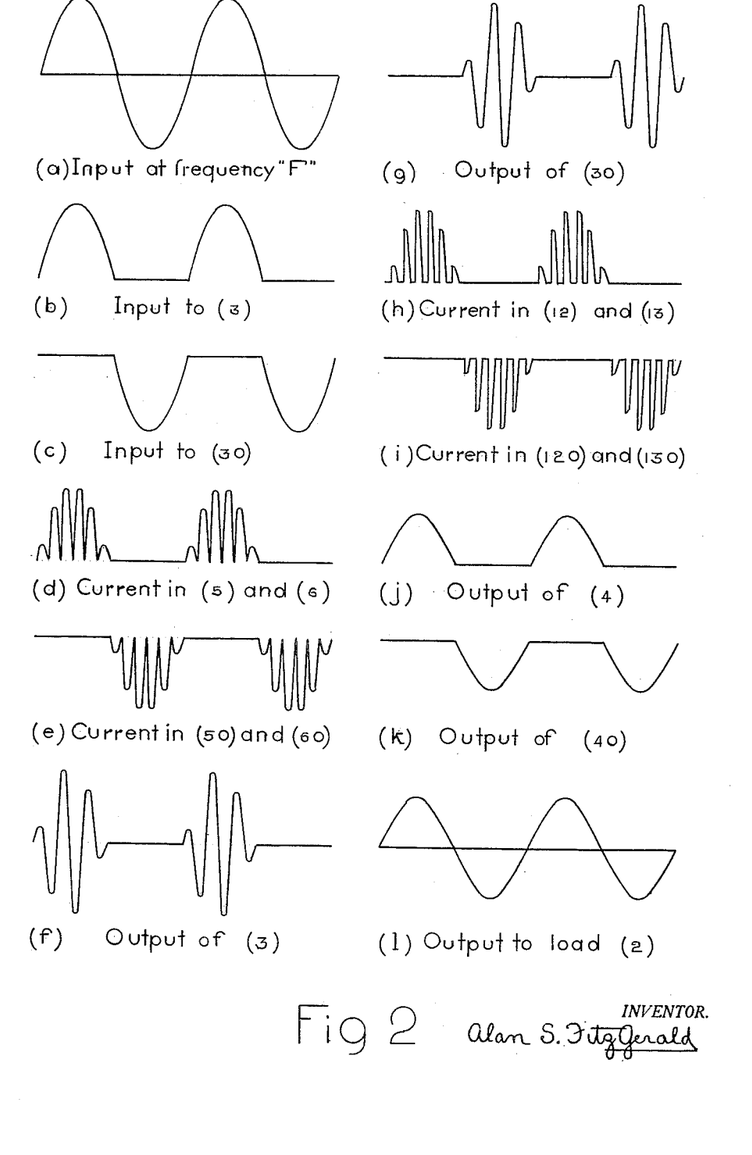
Fig. 2 is a view exemplifying the wave-shapes assumed by currents in various portions of the system illustrated in Fig. 1.

The alternate action of the inverters may be better understood in reference to Fig. 2 in which (d) and (e) show respectively the current in the vapor electric devices 5, 6 and 50, 60. This current is an intermittent uni-directional current the intermittency being of the frequency "f". The current drawn from the source 1 is intermittent at frequency "F" and likewise unidirectional. The current drawn from the source 1, respectively, by 3 and 30 is shown in (b) and (c). The resultant current drawn from 1 by both of the inverters is shown in (a).

In Fig. 2 (f) and (g) show the intermittent alternating current outputs of frequency "f" and having amplitude envelope corresponding to the wave shape of frequency "F" generated, respectively by the inverters 3 and 30. These alternating current outputs energize the primary windings of the output transformers 10, 100, in Fig. 1.

The secondary windings of the transformers 10, 100 are connected respectively to two grid voltage phase shift controlled rectifiers 4 and 40 comprising vapor electric devices 12, 13 and 120, 130 which may be of the type having anode, cathode and control electrodes, and of the type which conduct only when positive voltage is applied to the grid, or may be provided with suitable negative grid bias means not shown in the figure. Transformers 14, 140, likewise energized from the secondary windings of the output transformers 10, 100, are provided to furnish grid voltage to the devices 12, 13, 120, 130, through the agency of phase shift networks 15, 150 and grid transformers 16 and 160. Thus the grids of the devices 12, 13, 120, 130 are energized with an alternating voltage of frequency "f", synchronous with the anode voltage and capable of being varied in phase relative to the latter, in accordance with the adjustment of the networks 15 and 150.

In order to restrict all effects of frequency "f" to the control circuit and to preclude high frequency ripple entering the source 1 and the load circuit 2 I may include both in the inverter circuit comprising 3 and 30 and in the grid controlled rectifier circuit 4 and 40 suitable filtering means such as condensers 17, 170, 19 and reactors 18, 180, 20 as shown. It should be clearly understood that these filtering devices are only concerned with energy of frequency "f" and higher harmonics or multiples thereof and are therefore of negligible bulk and expense.

The phase shift networks 15, 150 may consist of any of a variety of different devices known to those skilled in the art, for providing a controlled phase shift in response either to a manual operation or automatically to any desired electrical or other controlling effect. For example the networks may include arrangements of electron discharge devices, (not shown) such as I have shown and described, for example, in Fig. 2 or the article written by me and published in "Electronics" page 467, January 1931, by means of which a phase shift is provided in accordance with any desired stimulus, controlling impulse or effect to which an electron discharge device may be susceptible.

The specific arrangement, however, is not especially material to my present invention and, by way of illustration, and in order to explain the operation of my invention in the most simple manner, I show, in Fig. 1 phase shifting means 15, 150 adapted to be actuated manually and consisting of networks including, in each two condensers of fixed value 21, 22 and 210, 220 respectively, additional condensers likewise of fixed value 23, 230, respectively and a resistor 24 common to both networks and capable of being varied by any convenient manual or mechanical means. It will be obvious to those skilled in the art that I may use either impedance networks involving variable capacitors, resistors, reactors, saturating reactors and the like or that I may employ electromagnetic rotating field means or other convenient devices for this purpose.

The function of the transformers 14, 140 is to provide electrical discontinuity between the electrode circuits of the rectifiers 4, 40, by way of the networks 15, 150 and the common resistor 24. It will be obvious to those skilled in the art that other equivalent arrangements may be employed such as, for example, by providing, in lieu of transformers 14, 140, additional windings on the transformers 10, 100 from which the networks 15, 150 may be energized.

Referring now to Figs. 1 and 2 it will be understood that the controlled rectifiers 4 and 40 are alternately energized, respectively, by the outputs of inverters 3 and 30 at the frequency "f" as depicted in Fig. 2 (f) and (g). Each of the devices 4, 40 is a full wave rectifier and accordingly, if we neglect for a moment the action of the grids and consider 12, 13, 120, 130 to operate as simple rectifiers, the output of the rectifiers 4, 40 will consist of full wave rectification of the high frequency input to the said devices, the envelope of the rectified output being in accordance with the wave shape of the voltage of the source 1.

We may now consider how this action is modified by the presence and effect of the grid control means. When a full wave grid voltage phase shift controlled rectifier is operated from a steady alternating current source the output will consist of rectified or direct current power the amplitude of which will be variable between the limits of a maximum and zero in accordance with the grid voltage phase angle. In addition, for any given grid voltage phase relation, the output will be proportional to the magnitude of the input voltage. Likewise, in the system shown in Fig. 1, the output of the controlled rectifiers 4, 40 will depend jointly upon the instantaneous magnitude of the alternating current input voltage at frequency "f" and upon the amount of lagging phase shift given to the grids. Thus, the output of the controlled rectifiers as depicted in Fig. 2 (h) and (i) will have the following characteristics:

Each half wave of frequency "F", as shown, is made up of a number of rectified half waves of frequency "f" both half waves being present since the devices 4, 40 are full wave rectifiers. The amplitude in Fig. 2 of each of the rectified half waves is a direct function of the instantaneous voltage of the source 1 of frequency "F". However, each of these half waves of frequency "f" is affected by the phase shift grid control action. If the grid voltage be adjusted so that it is in phase coincidence with the anode voltage, then the vapor electric devices 12, 13, 120, 130, will conduct throughout the positive half cycle of each device, and the rectified high frequency output will consist of a number of complete half waves each one having a base of 180° of the frequency "f".

If it now be considered that the grid voltage be adjusted to lag, for example, 90° behind the anode voltage, still with reference to frequency "*f*", the rectified output of controlled rectifiers will consist of a number of incomplete half waves of the frequency "*f*", as shown in Fig. 2 (*h*) and (*i*). In the instance exemplified, each of the rectified portions will have a base of only 90° and the total power delivered by the controlled rectifier will be one half of the value reached if the grid voltage and anode voltage be coincident in phase. Correspondingly, for any given phase relation the output of the controlled rectifiers will, in like manner, be controlled in accordance with the grid voltage phase angle, each individual half wave of rectified power at frequency "*f*" varying from a full half wave of 180° down to zero. The amplitude, as explained, will in each case depend upon the instantaneous value of the frequency "F" power and the envelope of the output of the rectifiers will be in accordance therewith.

The component at frequency "*f*" and above existing in the rectifier output may readily be taken out by means of the condensers 17, 170 and reactors 18 and 180 and the resultant output will be as depicted in Fig. 2 (*j*) and (*k*). It has been assumed that a certain amount of grid control action has been present in the rectifier operation and that the rectified current of frequency "*f*" consists of a number of incomplete half waves in consequence. Thus the filtered output of the rectifiers is less than the input to the inverters as shown in Fig. 2 (*b*) and (*c*).

It will be perceived on reference to Fig. 1 that the output circuits of the controlled rectifiers 4 and 40 are connected in parallel, so as to supply the load device 2, in opposite sense. Thus the combined output of the two rectifiers represents true alternating current of frequency "F" as shown in Fig. 2, 1. This output will coincide in wave shape with the source 1 and will be capable of variation, uniformly, from a maximum to zero.

In Fig. 1 I have shown, by way of example, inverters 3, and 30 as self exciting or oscillating inverters each one capable of oscillating at its own natural frequency. I have likewise shown the phase shifting networks 15, 150 as being excited from the inverter outputs through the medium of transformers 14, 140. I wish it to be understood, however, that this is only one of a number of different arrangements embraced by the spirit of my invention.

For example, in order to secure continuity of action at frequency "*f*" throughout all half waves of frequency "F", I may employ a separate source of frequency "*f*" of small power rating for grid excitation. From this source I may separately excite the grids of the vapor electric devices 5, 6, 50, 60, and in addition the grids of the vapor electric devices 12, 13, 120, 130, through any suitable phase shift means.

Figure 3:
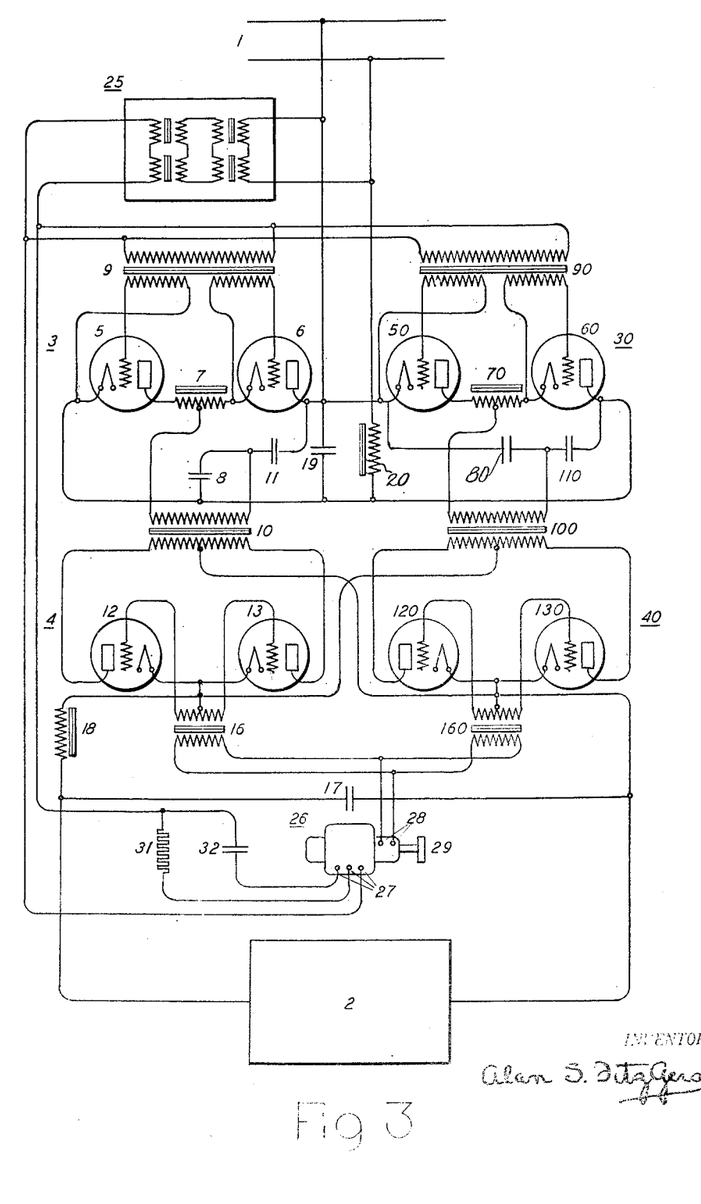
Fig. 3 is a diagrammatic view of an alternative to Fig. 1.

I show such an arrangement in Fig. 3.

According to the arrangement shown in Fig. 3 I employ inverters 3, 30, and controlled rectifiers 4, 40 substantially as shown in Fig. 1. However, the inverters 3, 30, in Fig. 3, instead of operating, at their own natural frequency, as oscillators, are separately excited from a source 25 of frequency "*f*". When driven in this manner they operate synchronously at the frequency of the source 25, as explained with reference to Fig. 1 of Patent 1,752,247. Accordingly, in Fig. 3 the grid formers 9, 90 are provided with additional primary windings to which the grid exciting frequency from the source 25 is applied.

As a source of power of the higher frequency "*f*" for exciting the grids of the vapor electric devices I may employ any suitable frequency changing or generating device, such as for example a small motor alternator, electron tube oscillator, or the like. It may in some instance be an advantage, though it is not essential, if the grid exciting frequency "*f*" be in synchronous relation with the source frequency "F". A very suitable device, therefore, for this purpose, in view of the very small amount of power required for grid excitation, is a frequency multiplier of the saturating reactor type, of which several different forms are well known to those skilled in the art. Not only do such devices have the advantage of possessing no moving elements nor parts requiring renewal, but they are particularly appropriate in that saturating type grid transformers are commonly used for separately exciting inverters of the type illustrated. This practice has been adopted in order to provide a voltage for grid excitation purposes, having a "peaked" wave form, wherein certain advantages known to those skilled in the art, are obtained.

In Fig. 3, therefore, I show, energized from the source 1, a saturating reactor type frequency multiplier 25 of the type illustrated in Fig. 15 page 467 of Moyer and Wostrel, The Radio Handbook, by means of which any given frequency may be tripled. While I have shown, by way of example, in Fig. 3, two stages of frequency multiplication, only, whereby a frequency of nine times the frequency "F" may be obtained, I wish to be clearly understood that frequencies of the highest order for which electron discharge or vapor electric devices are suitable are contemplated by my invention, and that as many additional stages as may be required may be embodied in 25. The multiple frequency output of 25 is connected to supply the primary winding of the grid transformers 9, 90 of the inverters 3, 30, and also, through a phase shift device 26 the primary windings of the grid transformers 16, 160 of the grid controlled rectifier 4, 40.

The phase shift device 26 may be of any suitable type. I have shown, by way of example a simple electro-mechanical device of the well known type having relatively movable primary and secondary windings. As shown in the drawing the phase shift device 26 possesses a polyphase type primary winding brought out to terminals 27 and a single phase secondary winding having terminals 28. Means, such as a split circuit comprising a resistance 31 and a capacity 32, are provided for setting up, in association with the polyphase winding, a rotational component in the magnetic field. Relative movement of the primary and secondary windings may be controlled by means of a knob or other suitable means 29. In this way the phase relation of the voltage appearing at the terminals 28 may be varied in a manner well known to those skilled in the art. The output of the secondary winding of 26 is connected to the primary windings of grid transformers 16, 160 of the controlled rectifiers 4, 40.

It will be obvious to those skilled in the art that as an alternative to the above arrangement, only the grids of the inverters 3, 30 may be excited from the frequency multiplier 25, the rectifier grids being excited and controlled exactly as in Fig. 1.

While I have shown in Fig. 1, by the way of example, an arrangement comprising two separate phase shift networks 15, 150 and a common control resistor 24 many other systems and connections as will be apparent to those skilled in the art may be made use of and fall within the spirit of my invention.

Obviously, I may use two separate resistors corresponding to 24 one in network 15 and the other in network 150, and may control both of the resistors jointly by any suitable mechanical coupling.

Moreover, while I have described the above as being especially suited to providing an alternating current output I do not wish to indicate that it is restricted thereto since, by reversing connection of the outputs of the rectifiers 4, 40 I may obtain rectified output power controllable by phase shift means in which no wave form distortion is introduced because of the presence of the control system. The output wave shape will be in accordance with that of the input under all conditions.

Figure 4:
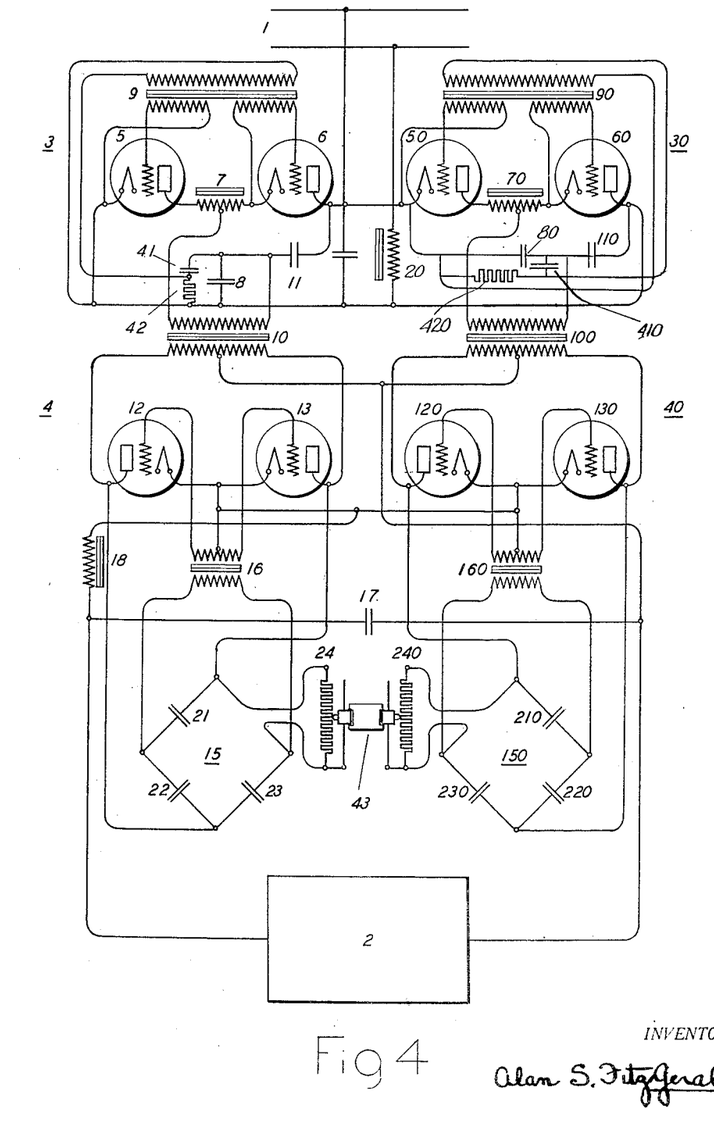
Fig. 4 is a diagrammatic view of a modification of my invention, as in Fig. 1, adapted to furnish uni-directional, instead of alternating, current output.

I show in Fig. 4 a modified arrangement of my invention in which the phase of the grid voltage of the rectifier 4, 40 is varied by means of two separate resistances instead of a single resistance and in which the anode circuits of the vapor electric devices 12, 13, 120, 130 are connected so as to supply to the load 2 rectified or unidirectional output.

In Fig. 4 I show inverters 3, 30 and grid controlled rectifiers 4, 40 substantially as in Fig. 1. The grid voltage applied to the controlled rectifiers being obtained likewise as in Fig. 1 from phase shift networks 15, 150.

In Fig. 4 I show the inverters 3, 30 self excited after the manner described in Patent No. 1,752,247 a portion of the output being fed back to the grid circuit, in proper phase relation for self excited oscillation. In order to achieve this result I connect in parallel with the capacitors 8, 80 capacities 41, 410 and resistances 42, 420 the resistances and capacities being connected in series. The voltage across the resistances 42, 420 is applied, as shown, to the primary windings of the grid transformers 9, 90.

The grid controlled rectifiers 4, 40 operate entirely as described in reference to Fig. 1 except that instead of being connected anode to cathode and cathode to anode the cathode and anodes are connected so as to supply rectified output to the load 2.

In place of the single control resistance 24 I show, in Fig. 4, two separate resistances 24, and 240 the former situated in network 15 and the latter in network 150. A suitable insulating means 43 may be provided whereby both resistances may be simultaneously actuated.

In view of the fact that 43 provides electrical discontinuity between networks 15 and 150, transformers 14, 140, shown in Fig. 1 are omitted in Fig. 4.

Among the especial advantages which are achieved by my invention, is that the power frequency energy, in passing through the control circuit, is subject to only one transformation, this transformation taking place at a higher frequency and the ratio of transformation being suitable to the load requirements. It is well known to those skilled in the art that the weight, bulk, and cost of transforming and filtering equipment varies inversely as the frequency. Moreover, all condensers and reactors present in the circuit are functional, only, at the higher frequency and, accordingly are of an order of magnitude, microfarads and henries, respectively, much lower than would be required if the said devices be functional at the power frequency as has been the case in systems represented by the prior art. Therefore, the bulk weight and cost of these items in the circuit are substantially less than in the case of corresponding equipment operating at the lower frequency.

It should be clearly understood that the novelty and utility of my invention does not reside solely in its use as a power controlling device after the manner described with reference to the foregoing figures.

If in Figures 1 or 3, there be substituted for the vapor electric devices 12, 13, 120, 130, similar devices, having two electrodes only, the grids being omitted, so that said devices function as simple rectifiers, and if the transformers 14, 140, networks 15, 150 and grid transformers 16, 160 be likewise omitted, my invention so modified presents new and useful features as a power transforming or translating system.

For example, in cases where it may be desired to transform electric power at a low frequency or at, or up to, a very high voltage such that a transformer operating at the power frequency might have an unduly large magnetic circuit or an inconveniently large number of turns my invention may be used, with or without the control feature, with advantage.

It has already been pointed out that the essential feature embodied in my invention is that transformation is accomplished, not at the power frequency, but at a frequency which may be much higher than the latter. Accordingly the transformers by means of which the voltage ratio is stepped up or down as the case may be will be reduced in cost, bulk and weight to an extent depending upon the frequency ratio. It is common knowledge that, an electron discharge tube or a vapor electric device has much less weight than has a transformer, of like power rating, designed to operate at a normal power frequency. Thus this feature of my invention may have considerable importance in the application of electrical systems to aircraft.

Figure 5:
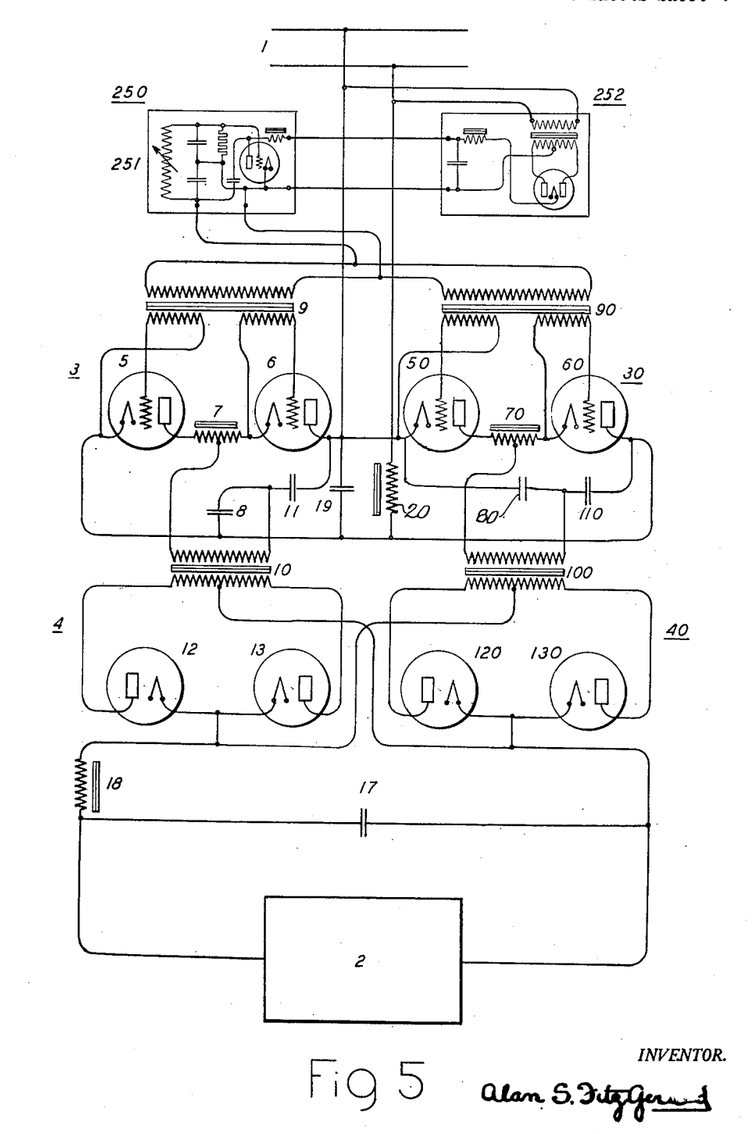
Fig. 5 is a diagrammatic view of a modification of my invention in which the power control feature, shown in Fig. 3, has been omitted.

In Fig. 5 I show an arrangement substantially similar to Fig. 3 with the exception that all control features associated with the grid control rectifiers 4, 40 are entirely omitted. Therefore, according to this arrangement the output of the inverters 3, 30 is transmitted, without modification, in amplitude, by the rectifiers 4, 40 to the load 2 the connection being as in Figs. 1 and 3, so as to furnish alternating current power to the load 2.

With such an arrangement either separately excited inverters or self exciting inverters may be employed. By way of example, I show in Fig. 5 the inverters 3, 30 separately excited in a manner similar to the arrangement shown in Fig. 3.

As a source of grid excitation voltage for inverters 3, 30 I show an electron tube oscillator 250 which may be of any suitable type and may consist either of a single electron discharge device, as shown, or may include a plurality thereof such as is employed in types of beat oscillator which are well known to those skilled in the art. The oscillator may be provided with frequency adjusting means such as a variable reactor 251. The oscillator may be energized from the source 1 through any suitable rectifying anode voltage supply source 252 of the type well known in connection with radio receivers and like devices.

Although I have chosen a particular embodiment of my invention for purposes of explanation, many modifications thereof will be apparent to those skilled in the art to which it pertains. My invention, therefore, is not to be limited except insofar as is necessitated by the prior art and the spirit of the appended claims.

What I claim as new and desire to secure by Letters Patent of the United States is:

1. An alternating current power control system, including means for converting the power to be controlled into power at a higher frequency, means for exercising a controlling effect on said higher frequency power, and means for converting the high frequency power, controlled in said manner, into power at a lower frequency.

2. An alternating current power translation system, including means for converting the power to be translated into power at a higher frequency modulated at the power frequency, means for transforming said high frequency power into power at a different potential, and means for converting the high frequency power, transformed to said different potential, into power of a lower frequency.

3. The invention set forth in claim 1 characterized in that the first mentioned converting means includes a plurality of substantially independent devices that are so connected to the primary power source as to be alternately active in response to successive half cycles.

4. The invention set forth in claim 2 characterized in that the first mentioned converting means includes a plurality of substantially independent devices that are so connected to the primary power source as to be alternately active in response to successive half cycles.

5. The invention set forth in claim 1 characterized in that the second mentioned converting means comprises a plurality of rectifying means.

6. The invention set forth in claim 2 characterized in that the second mentioned converting means comprises a plurality of rectifying means.

7. The invention set forth in claim 1 characterized in that the second mentioned converting means comprises a plurality of rectifying means connected effectively in parallel to supply a load.

8. The invention set forth in claim 2 characterized in that the second mentioned converting means comprises a plurality of rectifying means connected effectively in parallel to supply a load.

9. The method of controlling alternating current power from a primary source without introducing wave form distortion which comprises converting the power into power at a modulated higher frequency controlling the power at said higher frequency and deriving power at a lower frequency from said controlled power.

10. The method set forth in claim 9 characterized in that the instantaneous amplitude of the power at the higher frequency is caused to be a function of the instantaneous value of the voltage of the primary source.

11. The method set forth in claim 9 characterized in that the last power deriving step is accomplished by de-modulation of the higher frequency.

12. The method of controllably deriving power from a primary alternating current source, which comprises converting successive half cycles of power into recurring power impulses at a higher frequency, the frequency of recurrence being maintained coincident with the frequency of said source, controlling the amplitude of the power at said higher frequency, demodulating said power impulses to derive alternating power corresponding in phase and in wave shape to the power taken from said primary source, and thereafter combining said demodulated power impulses in a load circuit.

13. In a method of controlling alternating current power from a primary source, through the use of vapor electric devices that are rendered conductive during restricted portions of the positive half cycle, the step which includes raising the frequency of the power derived from said sources, before applying it to said devices, whereby all necessary transformation and filtering may be accomplished at a frequency materially higher than that of the source, resulting in a reduction in the bulk and expense of transforming and filtering apparatus.

14. An alternating current electric power control system including a source of power of given frequency, rectifying means for converting said power into power of a higher frequency, and further rectifying means, including means for restricting the conductivity of said rectifying means to portions of the positive half cycle, for controlling said high frequency power and for converting the high frequency power, controlled in said manner, into power at a lower frequency.

15. An alternating current electric power control system, including a source of power of given frequency, inverting means for generating power of a frequency higher than said source, the amplitude of said high frequency power being controlled by the instantaneous value of the voltage of said source of power, and including rectifying means for controlling the magnitude of said high frequency power, and for converting the high frequency power, controlled in said manner, into power of the same frequency as said source of power.

16. An alternating current electric power control system, including a source of power of given frequency and wave shape, a plurality of converting means, energized respectively by opposite half cycles of the said power source, to generate power of a frequency higher than that of the said source, the envelope of the high frequency power output of said converting means being in accordance with the wave shape of the half cycles of the power source energizing said converting means, and a plurality of uni-laterally conducting devices energized by said high frequency power, including means for controlling the instant in each high frequency conducting half cycle at which the devices initially become conducting, to control the average value of each half cycle of high frequency power conducted by said unilaterally conducting devices, said devices being connected respectively to rectify, and to control in said manner, the high frequency power generated by opposite half cycles of the source frequency, said rectifying and controlling means including high frequency filtering means to eliminate the high frequency component from the rectified output, and being so connected that the rectified output corresponding to opposite half cycles of the power source is delivered in opposite sense to the output circuit, to furnish said output circuit with alternating energy corresponding in frequency phase and wave form to the said source of power and controlled in magnitude in accordance with the said controlling action of the unilaterally conducting vapor electric devices.

17. An alternating current electric power control system, including a source of power of given frequency and wave shape, a plurality of inverting means energized respectively by opposite half cycles of the said power source, to generate power of a frequency higher than frequency of said source, the envelope of the high frequency power output amplitude of said inverting means being in accordance with the wave shape of the respective half cycles of the power source energizing said inverting means, and a plurality of uni-laterally conducting devices energized by said high frequency power, including phase shifting means for controlling the average value of each half cycle of high frequency power conducted by said unilaterally conducting vapor electric devices, said devices being connected respectively to rectify, and to control in said manner the high frequency power generated by opposite half cycles of the source frequency, said rectifying and controlling means including high frequency filtering means to eliminate the high frequency component from the rectified output, and being connected so that the rectified output corresponding to opposite half cycles of the power source is delivered in opposite sense to the output circuit, to furnish said output circuit with alternating current energy corresponding in frequency, phase, and wave shape with the said source of power and controlled in magnitude in accordance with the said controlling action of the uni-laterally conducting vapor electric devices.

18. An alternating current electric power control system, including a source of power of given frequency and wave shape, inverting means energized by alternate half cycles of the said source to generate, intermittently, power of a frequency higher than that of said source, full wave rectifying and controlling means energized by said intermittent high frequency power, to furnish half cycles of source frequency corresponding in phase and wave shape with the alternate half cycles energizing said inverting, rectifying and controlling means, and variable in magnitude in accordance with said controlling effect, together with further like inverting, rectifying and controlling means energized by opposite alternate half cycles of the source of power, to generate, intermittently, during half cycles when the first mentioned inverting means is inoperative, power of a frequency higher than that of said source, and likewise furnishing source frequency half cycles corresponding in phase and wave shape with the opposite alternate half cycles of the source of power energizing said inverting, rectifying and controlling means, and variable in magnitude in accordance with said controlling effect, said means being connected in opposite sense so that the alternate source frequency half cycles, controlled in said manner are combined to deliver an alternating current output.

19. An alternating current electric power control system, including a source of power of given frequency and wave shape, inverting means energized by alternate half cycles of the said source to generate, intermittently, power of a frequency higher than that of said source, full wave rectifying and controlling means energized by said intermittent high frequency power, to furnish half cycles of source frequency corresponding in phase and wave shape with the alternate half cycles energizing said inverting rectifying and controlling means, and variable in magnitude in accordance with said controlling effect, together with further like inverting, rectifying and controlling means energized by opposite alternate half cycles of the source of power, to generate, intermittently, during half cycles when the first mentioned inverting means is inoperative, power of a frequency higher than that of said source, and likewise furnishing source frequency half cycles corresponding in phase and wave shape with the opposite alternate half cycles of the source of power energizing said inverting, rectifying and controlling means, and variable in magnitude in accordance with said controlling effect, said means being connected in like sense so that alternate source frequency half cycles, controlled in said manner, are combined to deliver a rectified current output.

20. The method of transforming power from a primary alternating current source of given frequency, which comprises converting successive half cycles of power into recurring power impulses of alternating current at a higher frequency, the frequency of recurrence being maintained coincident with the frequency of said source transforming the power at said higher frequency, rectifying said power impulses to derive half cycles alternating power corresponding in phase and in wave shape to the power taken from said primary source, and thereafter combining said half cycles in a load circuit.

21. In a method of transforming alternating current power from a primary source, through the use of vapor electric devices, the step which includes raising the frequency of the power derived from said source before transforming it, whereby transformation is accomplished at a frequency materially higher than that of the source resulting in a reduction in the bulk and expense of transforming apparatus.

22. An alternating current electric power transforming system including a source of power of given frequency, rectifying means for converting said power into power of a higher frequency, transforming means operating at said higher frequency, and rectifying means for converting said high frequency power, transformed in said manner, into power at a lower frequency.

23. An alternating current electric power transforming system, including a source of power of given frequency, inverting means for generating power of a frequency higher than said source, the amplitude of said high frequency power being controlled by the instantaneous value of the voltage of said source of power, means for transforming said high frequency power to a different voltage, and including rectifying means for converting the high frequency power, transformed in said manner, into power of the same frequency as said source of power.

24. An alternating current electric power transforming system including a source of power of given frequency and wave shape, a plurality of converting means, energized respectively by opposite half cycles of the said power source, to generate power of a frequency higher than that of the said source, the envelope of the high frequency power output of said converting means being in accordance with the wave shape of the half cycles of the power source energizing said converting means, means for transforming the power at said higher frequency, and a plurality of uni-laterally conducting devices energized by said high frequency power, said devices being connected respectively to rectify said high frequency power generated by opposite half cycles of the source frequency, said rectifying means including high frequency filtering means to eliminate the high frequency component from the rectified output, and being so connected that the rectified output corresponding to opposite half cycles of the power source is delivered in opposite sense to the output circuit, to furnish said output circuit, with alternating energy corresponding in frequency phase and wave form to the said source of power.

25. An alternating electric power transforming system, including a source of power of given frequency and wave shape, inverting means energized by alternate half cycles of the said source to generate, intermittently, power of a frequency higher than that of said source, a transformer for transforming said high frequency power, rectifying means energized by said intermittent high frequency power, transformed in said manner, to furnish half cycles of source frequency corresponding in phase and wave shape with the alternate half cycles energizing said inverting, transforming and rectifying means, together with further like inverting, transforming and rectifying means energized by opposite alternate half cycles of the source of power to generate, intermittently, during half cycles where the first mentioned inverting means is inoperative, power of a frequency higher than that of said source and likewise furnishing source frequency half cycles corresponding in phase and wave shape with the opposite alternate half cycles of the source of power, transformed to a different voltage, said means being connected in opposite sense so that that the alternate source frequency half cycles transformed in said manner are combined to deliver an alternating current output.

26. The method of transforming alternating current power from a primary source which comprises converting the power into power at a modulated higher frequency, transforming the power at said higher frequency, and deriving power at a lower frequency from said transformed power.

27. The method set forth in claim 26 characterized in that the last power deriving step is accomplished by demodulation of the higher frequency.

28. An alternating current power transforming system including means for converting the power to be transformed into power containing components both of the power frequency and of a higher frequency, means for transforming said high frequency power into power at a different potential and means for converting the high frequency power transformed to said different potential into power at a lower frequency.

29. The invention set forth in claim 28 characterized in that the first mentioned converting means includes a plurality of substantially independent devices that are so connected to the primary source as to be alternately active in response to successive half cycles.

30. The invention set forth in claim 28 characterized in that the second mentioned converting means comprises a plurality of rectifying means.

ALAN S. FITZ GERALD.